United States Patent [19]

Hunt et al.

[11] 4,193,752

[45] Mar. 18, 1980

[54] MANUFACTURE OF MARBLED DETERGENT BARS

[75] Inventors: Leslie Hunt, Wirral; Ian T. Nicolson, Birkenhead; Thomas M. Whitfield, Wirral, all of England

[73] Assignee: Lever Brothers Co., New York, N.Y.

[21] Appl. No.: 935,825

[22] Filed: Aug. 22, 1978

Related U.S. Application Data

[62] Division of Ser. No. 779,774, Mar. 21, 1977, Pat. No. 4,162,288.

[30] Foreign Application Priority Data

Mar. 26, 1976 [GB] United Kingdom ............... 12242/76

[51] Int. Cl.[2] ................................................ B29F 3/12

[52] U.S. Cl. .................................. 425/131.1; 425/462

[58] Field of Search ..................... 425/131.1, 381, 462; 264/75, 211, 245

[56] References Cited

U.S. PATENT DOCUMENTS

| | | | |
|---|---|---|---|
| 3,779,676 | 12/1973 | Bernard | 425/131.1 |
| 3,884,605 | 5/1975 | Glelon | 264/75 |
| 3,890,419 | 6/1975 | Kaniecki | 264/75 |
| 3,923,438 | 12/1975 | Perla | 425/462 |

FOREIGN PATENT DOCUMENTS 1387567 3/1975 United Kingdom .

*Primary Examiner*—Jeffery R. Thurlow

[57] ABSTRACT

A liquid component can be introduced into a detergent bar by injecting liquid within or immediately downstream of a multi-apertured plate positioned before the compression cone of an extruder. The method can be used to produce marbled bars with the aid of a colored liquid and is described in UK Pat. No. 1387567.

When a double extruder is used together with a common expression cone the injected liquid becomes unevenly distributed within the detergent. Even distribution of the liquid as striations is achieved by use of a partition in the cone to ensure each detergent stream is subjected to separate compression during movement down the cone.

6 Claims, 3 Drawing Figures

MANUFACTURE OF MARBLED DETERGENT BARS

Figure 1:
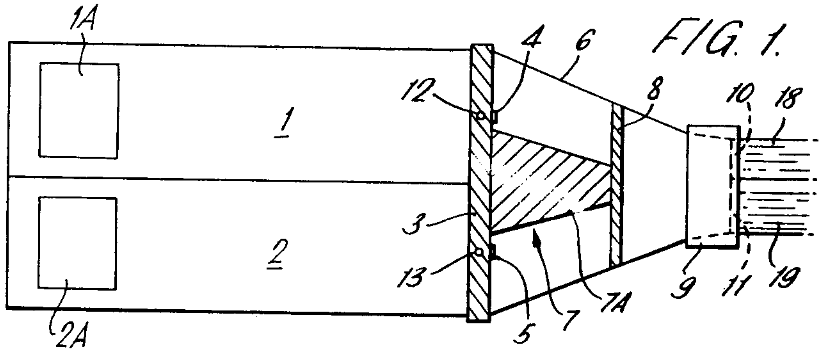

This is a divisional of application Ser. No. 779,774, filed Mar. 21, 1977 now U.S. Pat. No. 4,162,288 issued 7-24-79.

This invention relates to apparatus and processes for the injection of liquids into detergent bars intended for personal washing. The invention is particularly suited for injection into a detergent mass of a liquid including a material contrasting in colour with the detergent material.

When a colour contrast liquid is injected the resulting detergent bar has a multi-coloured appearance which may be described as striped, mottled or marbled, dependent on the subjective assessment. The apparatus and method may also be utilised to introduce a liquid into a detergent mass containing additives, for example germicides and skin benefit materials, which are required to be distributed throughout the mass.

In Applicants' UK patent specification No. 1387567 there is described and claimed method and apparatus for introducing liquids into detergent bars. In this previous disclosure the method of manufacturing detergent bars comprises the steps of passing a detergent mass through a multi-apertured plate to form rods, introducing a liquid between the rods in at least one position, compressing the rods inwardly to form a continuous mass having striations of the liquid therein, cutting the mass into billets and stamping the latter to form bars.

The term "detergent" is used herein to include both soaps, i.e. alkali metal salts of long chain fatty acids and non-soap synthetic detergents, i.e. salts of alkyl sulphates, alkaryl sulphonates, alkane sulphonates and sulphonated long chain fatty acids. There is no criticality in the detergent provided it is extrudable. The injection points for introducing liquid into the detergent mass may be positioned in conduits extending through the apertures of the multi-apertured plate as disclosed in UK Pat. No. 1387567.

The disclosure in UK patent specification No. 1387567 is incorporated herein by reference.

In the Applicants' previously disclosed method the liquid which is introduced between the rods in at least one position is distributed substantially throughout the detergent mass in a uniform manner by the inward compression exerted on the rods as they pass through the extrusion cone which has a decreasing sectional area. The specific embodiments described relate to a single screw plodder extruding a detergent mass into a single extrusion cone. At the interface between the multi-apertured plate at which the liquid is injected and the extrusion cone the sectional areas of the plate and cone correspond. Therefore the detergent rods are extruded over an area and are immediately subjected to compression within a cone reducing in area from the area of the plate.

The Applicants have found a twin screw plodder can be utilised for the method described in UK Pat. No. 1387567 and the liquid injected is distributed substantially throughout the detergent mass. However, the distribution of liquid throughout the detergent mass is substantially uniform only if a modification is made to the extrusion (compression) cone of the plodder. The present invention provides a method and apparatus as claimed in UK Pat. No. 1387567 with the provision within the compression cone of a partition extending downstream from the non-apertured area of the multi-apertured plate. In the absence of the partition the liquid concentrates throughout the detergent mass towards the centre of the multi-apertured plate together with a soap mass which does not move down the cone.

The partition is shaped so that the two bundles of detergent rods are individually subjected to substantially even inward compression around their circumferences as they move down the compression cone. Subjecting the separate bundles of rods to substantially even pressure around their circumference is effective to cause substantially uniform distribution of liquid as stripes throughout the compressed detergent mass.

The compression cone terminates in an extrusion plate which has two side by side apertures each aligned with one stream of compressed rods. It is convenient to cut the extruded mass from each extrusion aperture into billets with knives extending across the paths of the extruded masses. Operating with the partition extending to and abutting the extrusion plate it is found the extruded masses may move at differing velocities due to slight differences in operating conditions between the two plodder screws. Preferably, the partition terminates at a point upstream of the extrusion plate so that the two extruded masses come into contact prior to extrusion. This contact removes or at least reduces the differences in velocities of the two compressed bundles so that the masses extruded through the twin extrusion plate have substantially the same velocity and can be cut into billets by knives extending across their width.

An apertured downstream plate may also be present to improve the distribution of liquid in the compressed streams. This plate may also support the partition.

The cut billets may be subjected to normal longitudinal stamping or axial stamping which provides stripes radiating from a central mottled area or stamped at an angle (skew) to give diagonally running stripes on the bar surface. The billets may be twisted to give a spiral striping effect before stamping.

The liquid injected will preferably contrast in appearance with the detergent mass, for example it may contain a dye contrasting with the due or pigment in the base. Alternatively it may contain the same dye or pigment in a different concentration.

The liquid may contain a component providing a benefit, for example a germicide, whether or not the liquid contrasts with the base. The liquid may be a component giving a benefit on the skin when the detergent bar is used; an example is a hand cream.

Figure 2:
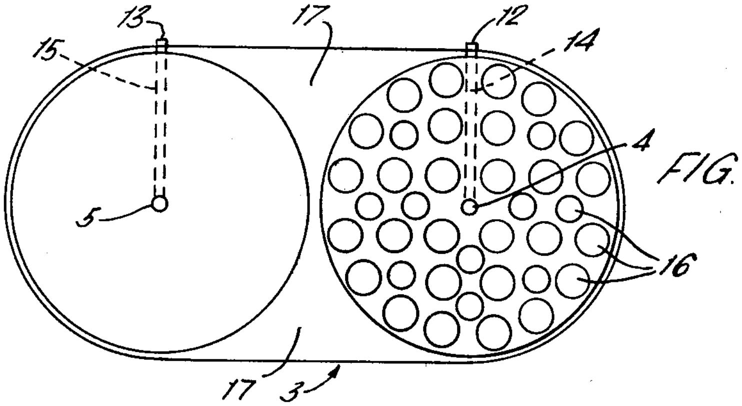
Figure 3:
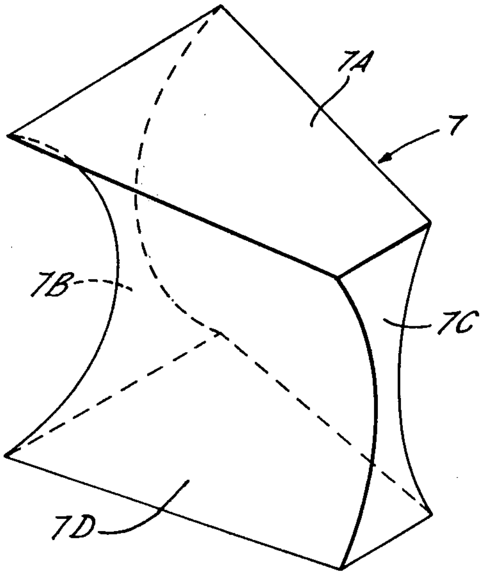

An embodiment of the apparatus and an example of the process of the invention will now be described with reference to the accompanying diagrammatic drawings in which FIG. 1 shows a plan view of part of a twin screw plodder with the upper surface of the compression cone removed to show the interior arrangements, FIG. 2 is an end view of the multi-apertured liquid injection plate and, FIG. 3 is an isometric view of the partition.

In FIG. 1 screw extruders 1 and 2 having feed funnels 1A, 2A, are positioned side by side and extrude detergent material through multi-apertured plate 3. This plate carries injection points 4,5 centrally positioned within apertured circular areas. (The apertures in one area are not shown). Plate 3 has about 60 apertures each of about 35 mm diameter. The injection points are supplied with liquid under pressure through conduits 14,15 and conduit openings 12,13 respectively. More than one injection point may be present for each apertured area. The detergent mass is formed into rods by passage through the apertured plate and passes through an extrusion (compression) cone 6 which terminates at a twin apertured extrusion plate 9. Plate 9 has apertures 10,11 through which continuous detergent masses 18,19 are extruded. When a liquid with a colour contrasting to the base detergent material is injected through points 4,5 the detergent masses 18, 19 have a striped or marbled appearance.

A partition 7 positioned adjacent the downstream face of the multi-apertured plate 3. The partition comprises an upstream face 7B which abuts non-apertured area 17 of the multi-apertured plate. The partition 7 comprises in addition to the upstream face 7B a downstream face 7C which has a shape similar to 7B but of smaller dimensions. The upper face 7A and a corresponding bottom surface abut the inner top and bottom surfaces of the compression cone. Side surface 7D and a corresponding surface on the other side of the partition are curved in substantially cylindrical cone form to ensure the bundles of rods extruded through apertures 16 of the multi-apertured plate 3 are separately subjected to substantially even inward pressure while moving between the apertured plate 3 and the downstream apertured plate. As may be readily observed from the drawings, the upstream end portion of each surface 7D, adjacent to the upstream face 7B, has a smaller effective radius of curvature than the downstream end portion of each surface 7D, adjacent to the downstream face 7C. Surfaces 7D are shaped so that each detergent stream passes through a separate compression volume. The downstream plate 8 abuts downstream surface 7C of the partition and has about 100 apertures each of about 20 mm diameter. The downstream plate 8 may have discontinuous contact with the side wall of the compression cone because some of the apertures cut its peripheral surface.

When a detergent mass is extruded through the apertures on each of the circular areas in plate 3 bundles of rods are formed and as these bundles are compressed inwardly the liquid injected through injection points 4,5 is distributed substantially uniformly throughout the bundle. The total detergent mass passes through the downstream plate 8 where the quality of striping is improved.

A white soap base comprising sodium salts of tallow and coconut fatty acids was extruded through apertured plate 3 and a liquid containing suspended blue dye injected through points 4,5. The dye liquid had a composition in percentages by weight, of water 9.5%, glycerine 83%, sodium carboxymethyl cellulose 1.5%, Monastral Blue BVS Paste 2%, Ansteads Green 11125 4%. Monastral is a Registered Trade Mark. The amount of dye liquid injected was 500 grams per 100 kilogrammes of soap and the extruded mass which had a blue striping was cut into billets and stamped to form bars.

What we claim is:

1. Detergent processing apparatus suitable for the injection of liquid into a detergent mass comprising two extruders, a common extrusion cone into which the extruders open, apertured pressure plate areas between the extruders and the extrusion cone, an unapertured area between said apertured areas, liquid injection means positioned within or immediately downstream of the apertured plate areas, a partition extending downstream from the unapertured area, and side surfaces on the partition forming together with the inner surfaces of the extrusion cone separate compression volumes for each detergent stream.

2. Apparatus according to claim 1 wherein the partition terminates within the extrusion cone.

3. Apparatus according to claim 1 or 2 comprising a second apertured plate downstream of the partition.

4. Apparatus according to claim 3 wherein the second apertured contacts the downstream termination of the partition.

5. Apparatus for injecting a fluid into a detergent mass of a different color to form a product of generally striped or marbled appearance, said apparatus comprising:

(a) means for extruding a detergent mass as two portions each through a respective multi-apertured section of an apertured plate simultaneously into a common extrusion cone;

(b) means for injecting fluid of a different color into each of said mass portions concomitantly as said mass portions begin to enter said extrusion cone; and (c) means for advancing said mass portions impregnated with said different colored fluid under extrusion pressure in spaced relation with one another along opposite side surfaces of a partition disposed in said extrusion cone and extending downstream from and between the multi-apertured sections, said opposite side surfaces each being partially conical and cooperating with the interior of said extrusion cone to present two separate chambers through which said fluid-impregnated mass portions are separately extruded respectively.

6. Apparatus according to claim 5 wherein said partially conical opposite side surfaces of said partition each presents an upstream end portion and a downstream end portion, each said upstream end portion having a smaller effective radius of curvature than each said downstream end portion.

* * * * *